United States Patent

Pick

Patent Number: 5,161,356
Date of Patent: Nov. 10, 1992

[54] STALK CHOPPER AND CRUSHER ACCESSORY

[76] Inventor: Norbert Pick, Am Wildzaun 38, D-6082 Mörfelden Walldorf, Fed. Rep. of Germany

[21] Appl. No.: 753,501

[22] Filed: Sep. 3, 1991

[30] Foreign Application Priority Data

Sep. 7, 1990 [DE] Fed. Rep. of Germany ....... 4028468

[51] Int. Cl.⁵ ............ A01D 41/12; A01D 45/02; A01D 75/00
[52] U.S. Cl. .................................. 56/60; 56/16.5; 56/500; 56/14.6; 56/DIG. 9
[58] Field of Search ............ 56/60, 61, 500, 502, 56/504, 16.5, 14.6, DIG. 9; 460/112, 25

[56] References Cited

U.S. PATENT DOCUMENTS

| | | | |
|---|---|---|---|
| 988,844 | 4/1911 | Wilson | 56/500 |
| 4,539,799 | 9/1985 | Kalverkamp | 56/500 X |
| 4,553,379 | 11/1985 | Kalverkamp | 56/98 X |
| 4,864,807 | 9/1989 | Ostrup et al. | 56/60 |

FOREIGN PATENT DOCUMENTS

0091635A1 8/1983 European Pat. Off. .

Primary Examiner—Stephen J. Novosad
Attorney, Agent, or Firm—Christensen, O'Connor Johnson & Kindness

[57] ABSTRACT

A harvester thresher or combine has a picking slot through which grain stalks are pulled to separate the stalks from the grain heads. Two oppositely rotated, parallel shafts are located at opposite sides of the picking slot. Each shaft has at least one cutting disk in close cutting relationship with the cutting disk of the other shaft. A vaned crusher element is mounted adjacent to each cutting disk and has its radial vanes arranged for intermeshing with the vanes of the element on the other shaft. The tips of the vanes project outward farther than the periphery of the adjacent cutting disk for assisting in pulling the stalks through the picking slot for chopping and crushing by the cutting disks and crushing elements.

5 Claims, 3 Drawing Sheets

STALK CHOPPER AND CRUSHER ACCESSORY

BACKGROUND OF THE INVENTION

1. Field of the Invention

The present invention relates to an attachment for a grain harvester thresher or combine for chopping and crushing stalks of the grain crop, particularly corn.

2. Prior Art

European patent application publication No. 0 091 635 discloses a harvester in which stalks of a grain crop are pulled through a picking slot to separate the grain heads, such as corncobs, from the remainder of the plant. Such harvester includes mechanism for crushing the plant stalks after leaving the picking slot between a picking roller and a stationary partial housing and for chopping the stalks by an adjacent fixed knife.

Experience has shown that the chopping and crushing effectiveness of the accessory decrease over time due to wear on the various parts which affects the speed and efficiency of the entire harvester thresher or combine. Consequently, harvester threshers or combines often are not provided with a stalk-chopping or crushing attachment, so that more than one trip over the field is required which can increase expense and also increase contamination of the environment.

SUMMARY OF THE INVENTION

The present invention provides an accessory for a harvester thresher or combine for chopping and crushing the stalks of a grain crop without substantially increasing the power requirements of the machine and in a form reducing maintenance expeditures while achieving a substantially constant quality and speed of work.

In the preferred embodiment, two oppositely rotated, parallel shafts are located at opposite sides of the picking slot. Each shaft has at least one cutting disk in close cutting relationship with the cutting disk of the other shaft. A vaned crusher element is mounted adjacent to each cutting disk and has its radial vanes arranged for intermeshing with the vanes of the element on the other shaft. The tips of the vanes project outward farther than the periphery of the adjacent cutting disk for assisting in pulling the stalks through the picking slot.

Preferably, a plurality of cutting disks and vane elements are mounted on each shaft.

The cutting disks and vaned elements preferably are detachably mounted on the shafts for replacement as wear and tear requires.

A common drive is provided for both shafts to maintain the desired intermeshing relationship of the vaned crusher elements of the respective shafts.

Mechanism is provided for biasing the cutting disks against each other to assure a reliable slicing action.

DETAILED DESCRIPTION

Figure 1:
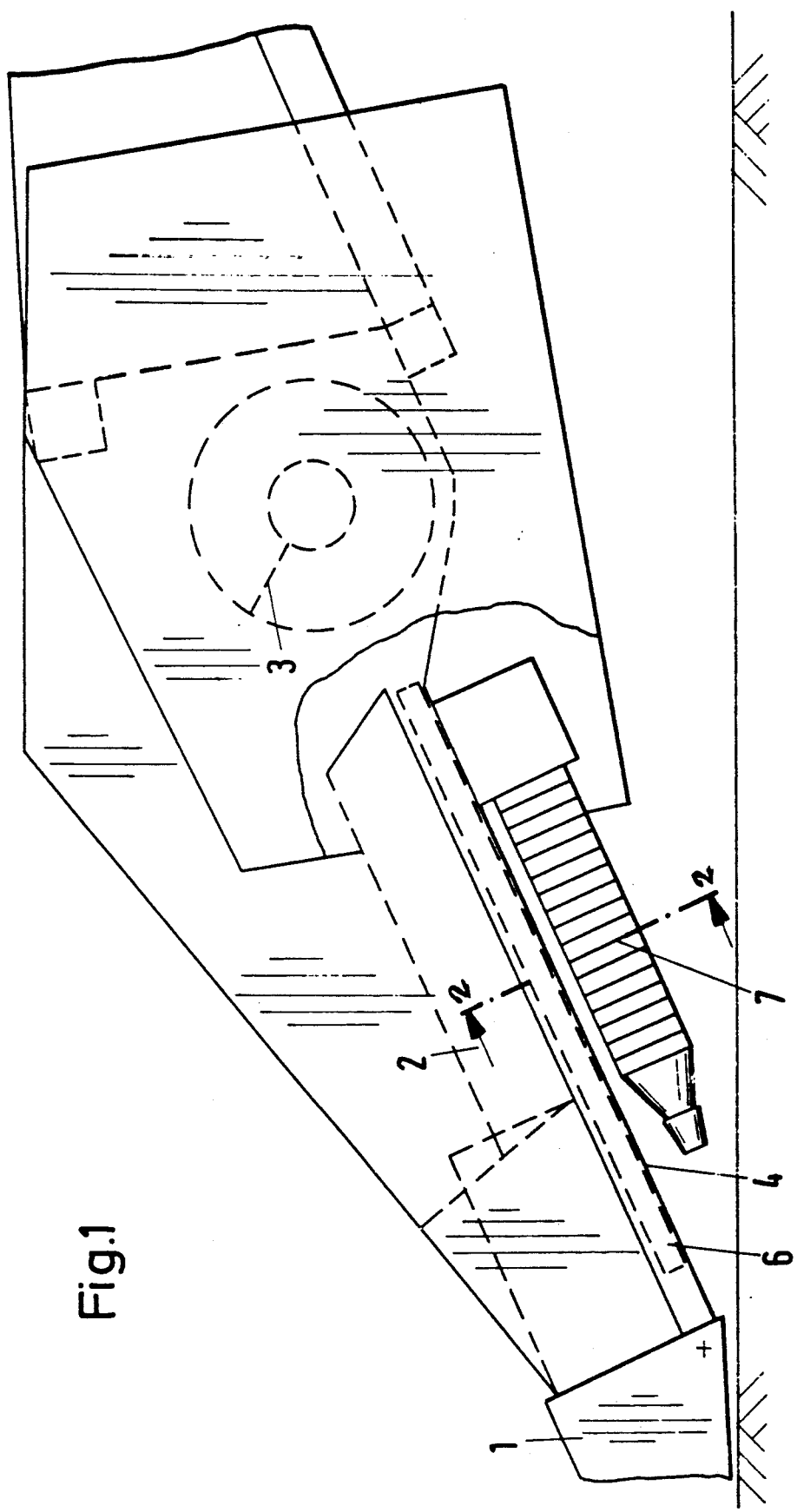
FIG. 1 is a diagrammatic fragmentary side elevation of the leading end portion of a harvester thresher or combine having a stalk chopper and crusher accessory in accordance with the present invention.

The harvester shown in FIG. 1 includes an inlet component 1 at the leading end of the machine and an inclined feed chute 2 leading to the auger 3 for conveying grain heads to a collection container or threshing apparatus.

Feed mechanism 6 is provided in the base of the feed chute at opposite sides of a picking slot 4. Stalk-cutting disks 7 and associated rotating crushers are mounted under the picking slot.

Figure 2:
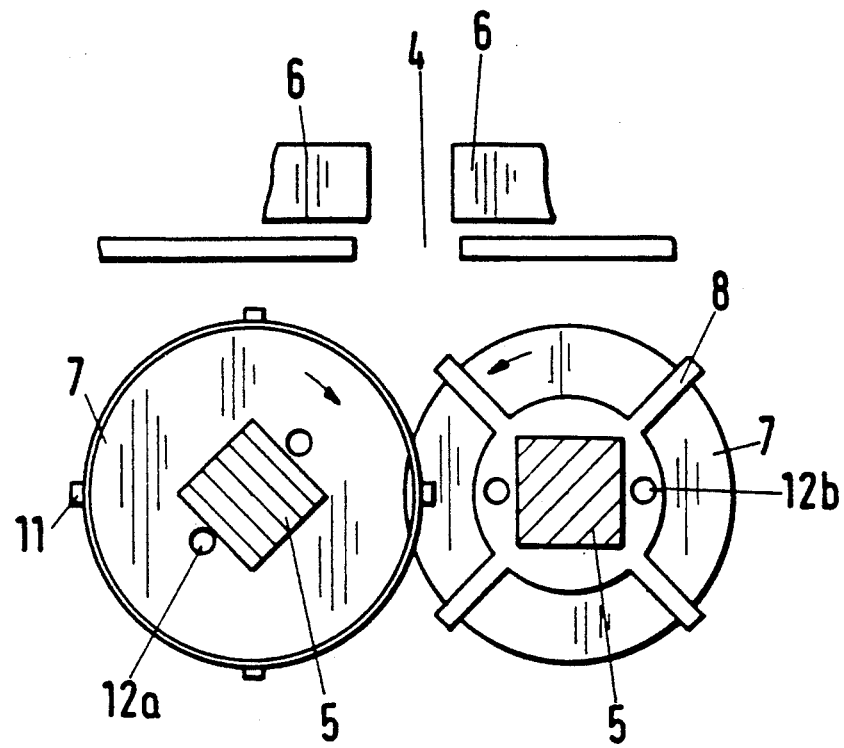
FIG. 2 is a diagrammatic section along line 2—2 of FIG. 1.

With reference to FIG. 2, the stalk-cutting and crushing accessory includes oppositely rotating shafts 5 extending longitudinally below and at opposite sides of the picking slot 4. At least one cutting disk 7 is detachably mounted on each shaft along with at least one adjacent vaned crusher element 8.

Figure 3:
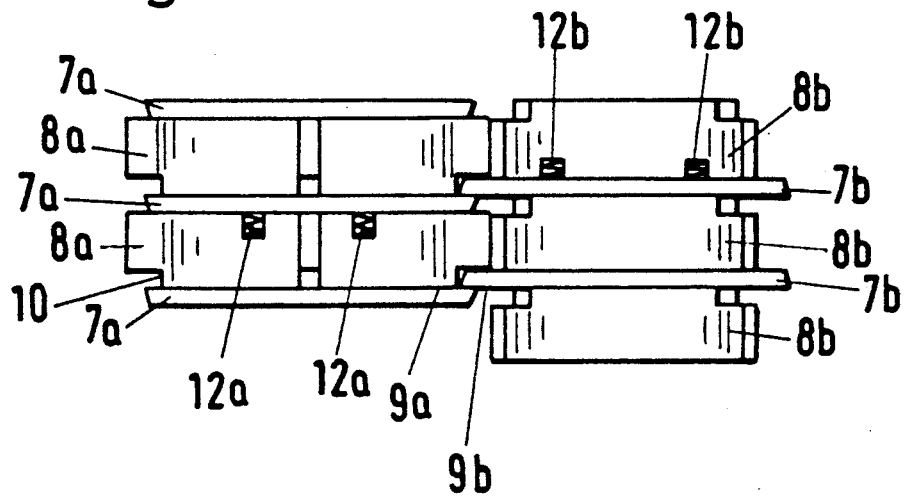
FIG. 3 is a diagrammatic top plan of components of the accessory in accordance with the present invention.

As best seen in FIG. 3, preferably each shaft has a plurality of spaced cutting disks 7a or 7b. At the center of the device, each disk overlaps a disk of the other shaft. For each disk 7a or 7b, there is an associated vaned crushing element 8a or 8b. The crushing elements have circumferential slots 10 registered with the cutting disks on the other shaft. The depth of the circumferential slots is slightly greater than the maximum distance of overlap of the cooperating cutter disks.

The outer ends 11 of the radial vanes of crusher elements 8a and 8b project outward beyond the periphery of the adjacent cutting disk 7 for pulling the stalks downward into the accessory as the shafts are rotated oppositely as indicated by the arrows in FIG. 2.

With reference to FIG. 3, cooperating cutting disks are biased together such as by springs 12a and 12b for a close slicing relationship of the disks. In operation, the plant stalks pass through the picking slot and are pulled downward into the chopper-crusher by the vanes 8. The cooperating cutting disks chop the stalks into short pieces which are crushed by the intermeshing action of the vaned elements.

In the modified embodiment shown in FIGS. 4 and 5, as in the previously described embodiment, cutting disks 13 and vaned crusher elements 14 are detachably mounted on oppositely rotated shafts below and at opposite sides of a picking slot. Adjacent edges 15a and 15b of cooperating cutting disks 13 overlap at the center for a close slicing relationship.

Figure 5:
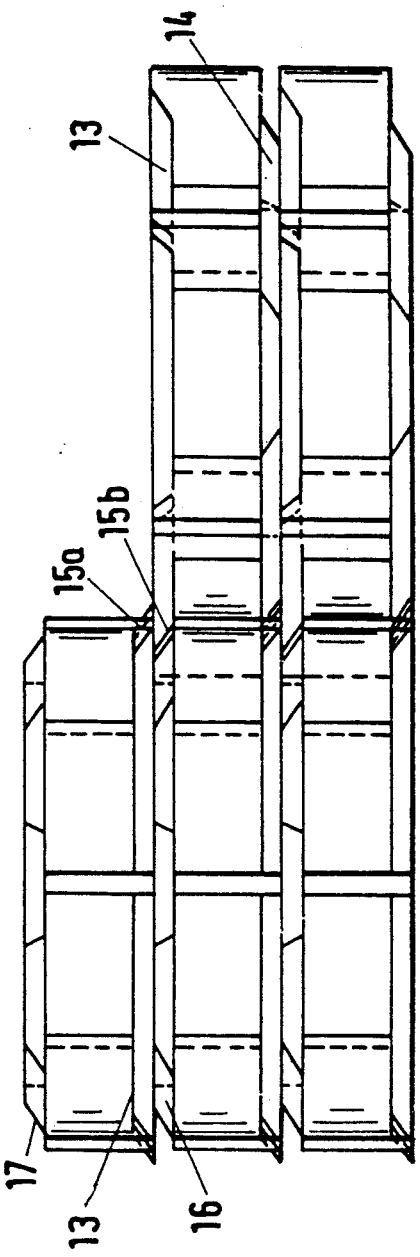
FIG. 5 is a diagrammatic top plan of components of the modified accessory of FIG. 4.

To prevent cut material from becoming jammed between cooperating cutting disks or wedging the overlapping portions of the disks apart which could affect a clean slicing action, as best seen in FIG. 5 each cutting disk has an associated rotating anvil ring 16 aligned radially with the cooperating cutting disk on the other shaft. Therefore, a clean cut is assured both by cooperation of the overlapping edges of the cutting disks and cooperation of each disk with the radially aligned rotating anvil ring.

As seen in FIG. 5, the edges of the cutting disks and anvils are beveled which has the effect of generating an axial force component tending to bias the cutting disks together during the cutting operation.

Figure 4:
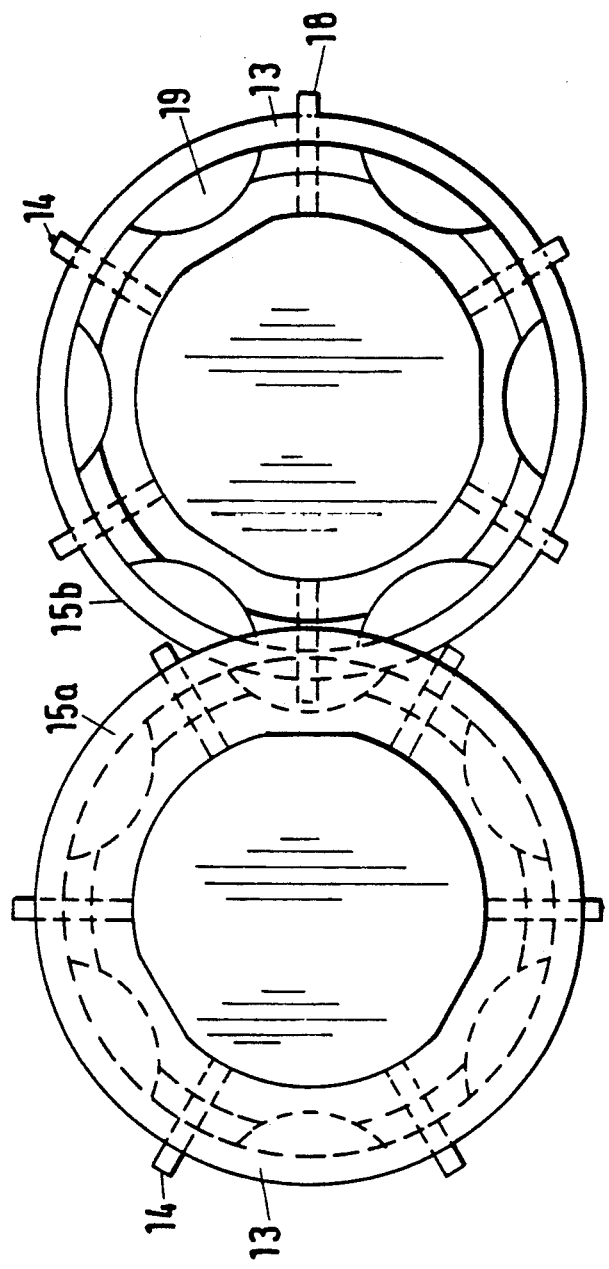
FIG. 4 is a diagrammatic end elevation of components of a modified form of stalk chopper and crusher accessory in accordance with the present invention.

As shown in FIG. 4, the vaned crusher elements can have concave recesses 19 for intermeshing with the radially projecting portions 18 of the vanes.

I claim:

1. In a grain harvester having a picking slot for separating grain heads from the stalks of a grain crop and mechanism for chopping the stalks, the improvement comprising the chopping mechanism including two oppositely rotatable shafts spaced apart adjacent to the picking slot, at least one cutting disk mounted on each shaft, a vaned crusher element mounted on each shaft adjacent to the cutting disk of such shaft, the cutting disks having cutting edges overlapping centrally between the shafts for slicing the stalks, the vaned crusher element on each shaft having radial vanes intermeshing with the vanes of the crusher element on the other shaft, the vanes of each crusher element projecting radially outward beyond the periphery of the adjacent cutting disk.

2. In the harvester defined in claim 1, means for biasing the cutting disks relatively together axially of the shafts for maintaining a close slicing relationship of the disks.

3. In the harvester defined in claim 1, the cutting disks and crusher elements being detachably mounted on the shafts.

4. In the harvester defined in claim 1, the crushing element on each shaft having a circumferential slot for receiving the periphery of the cutting disk mounted on the other shaft.

5. In the harvester defined in claim 1, the improvement further comprising the cutting disk on each shaft having an anvil ring mounted adjacent thereto in radial alignment with the cutting disk of the other shaft.

* * * * *